United States Patent [19]

Lago

[11] 3,830,262

[45] Aug. 20, 1974

[54] ARTICLE FOR SOLDERING ALUMINUM TO COPPER

[75] Inventor: Ernest T. Lago, Jackson, Mich.

[73] Assignee: Aeroquip Corporation, Jackson County, Mich.

[22] Filed: Apr. 20, 1972

[21] Appl. No.: 246,068

[52] U.S. Cl.................. 138/143, 29/199, 138/109, 285/173
[51] Int. Cl............................................ F16l 13/08
[58] Field of Search..................... 138/109, 140–143, 138/145, 146; 29/199; 285/173, 329

[56] References Cited
UNITED STATES PATENTS

| | | | |
|---|---|---|---|
| 1,595,309 | 8/1926 | Mueller et al. | 285/173 |
| 2,745,797 | 5/1956 | Long | 138/145 X |
| 2,823,933 | 2/1958 | Hickman et al. | 285/173 |
| 3,042,428 | 7/1962 | Gardiner | 29/199 X |
| 3,621,883 | 11/1971 | Miller | 138/143 |

*Primary Examiner*—Charles A. Ruehl

[57] ABSTRACT

A copper sleeve on its inside is placed in one end of a slidable barrel on a hand tool. The end of an aluminum tube is clamped in alignment with the barrel so that it contacts a flared end of the sleeve. Heat and axial hand pressure are applied to the barrel until the sleeve is forced over the aluminum tube. The tube may then be soft soldered to a brass, copper or steel fitting.

3 Claims, 6 Drawing Figures

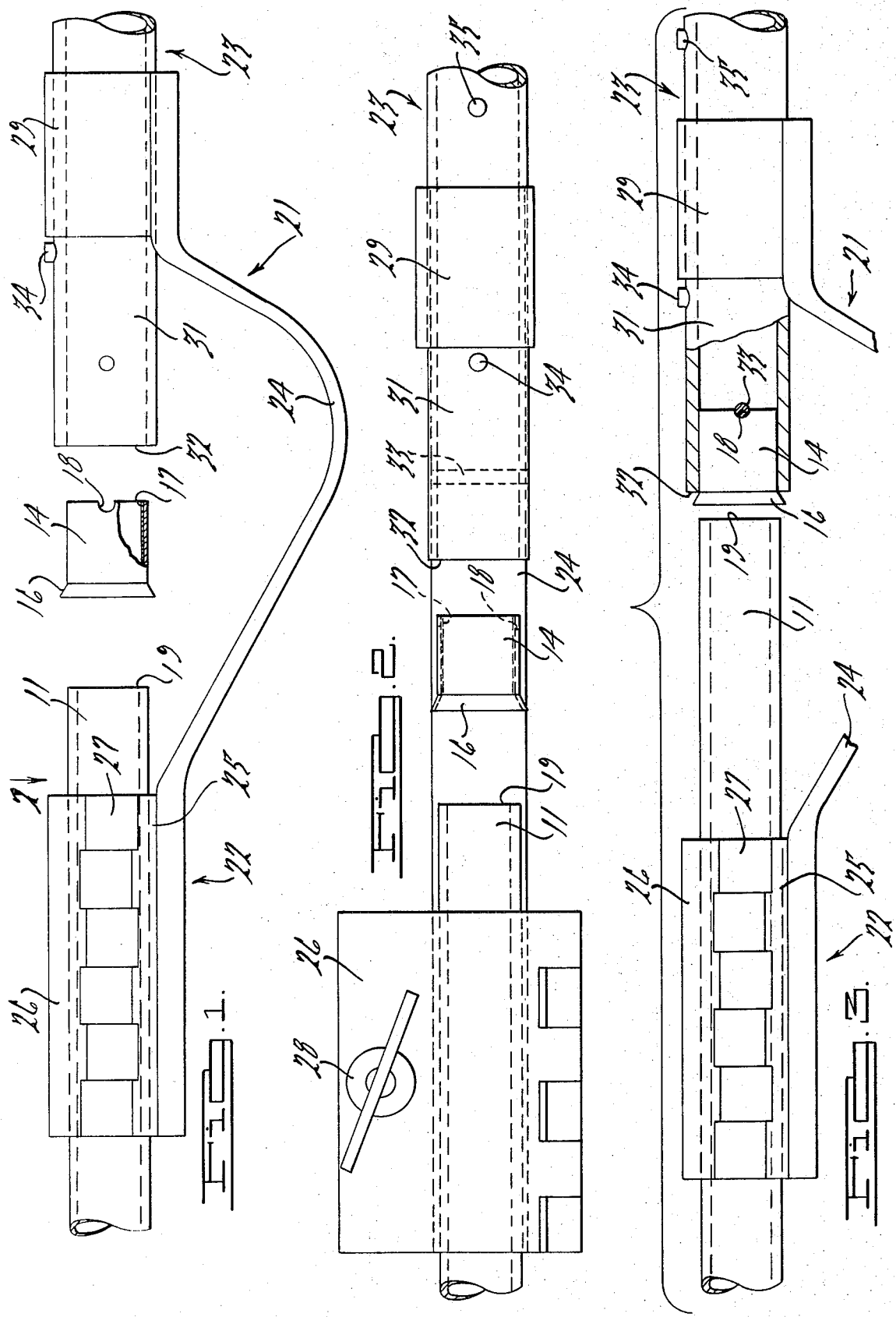

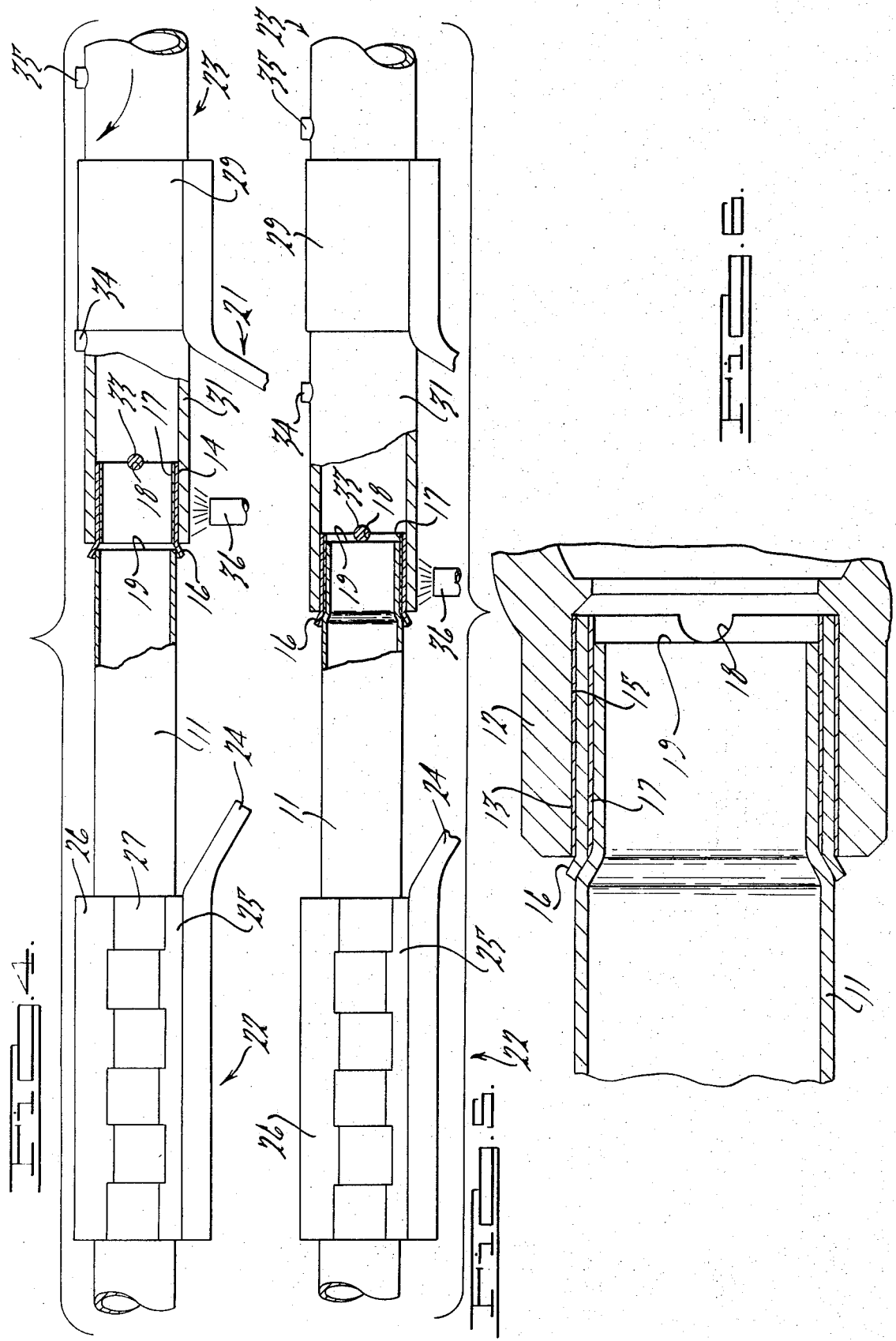

ARTICLE FOR SOLDERING ALUMINUM TO COPPER

BACKGROUND OF THE INVENTION

1. Field of the Invention

The invention relates to the joining of aluminum tube to other metals such as brass, copper or steel fittings by soft soldering. The invention has particular application to field installations where aluminum rather than copper tube is used. Such use is increasing in fields such as refrigeration equipment installation and repair, where equipment is conventionally restricted to the use of brass or copper fittings. Installers often wish to run open aluminum tube in the field and solder this tube to such fittings.

2. Description of the Prior Art

Aluminum tube can be hard soldered to brass or copper fittings as a factory in-house operation, using a special flux which deposits zinc on the workpiece at hard soldering temperatures (750°–800°F. ). This process requires a special tube end configuration including a flare and a 10° taper on the female member. Acid or abrasive cleaning is necessary for both members, and since the flux is corrosive, 100 percent flux removal is required.

Aluminum can be soft soldered in line-to-line rather than tube-to-socket applications by the use of an organic flux requiring pre-cleaning and close heat control. Aluminum may also be soft soldered to other metals by electroplating a deposit of brass, copper, tin or silver on the tube in the solder area to serve as an interface material, or by use of a copper-to-aluminum transition joint presently used in the industry. In some cases, a copper stub approximately six inches long is attached to an aluminum tube either by flash welding or hard soldering, the latter step involving pre-tinning of both members with a zinc base material in ultrasonic solder pots. The parts are assembled and heated in hydraulically driven fixtures.

However, there is no field method known for rendering as-received aluminum tube solderable to other metals by the widely used art of soft soldering.

BRIEF SUMMARY OF THE INVENTION

It is an object of the present invention to provide a method and apparatus which will make feasible the attachment of any desired length of aluminum tube to a copper, brass or steel fitting by conventional soft soldering in the field, without the need for acid or abrasive cleaning or previous electroplating.

It is another object to provide a method and apparatus of this nature which is relatively simple and economical to construct and reliable in operation.

Briefly, the invention comprises the use of a thin copper sleeve of the same outside diameter as the aluminum tube and a pretinned interior surface. The end of the aluminum tube which it is desired to attach to the fitting is pressed against a flared end of this sleeve and heat applied thereto. As the melt temperature of the tinning material is reached, a twisting pressure action will force the sleeve over the aluminum tube. The interference fit and the zinc base material will assure a leakproof bond. The tube may then be soft soldered to the fitting in the conventional manner.

A hand tool is provided for carrying out this method, comprising a clamp for the tube and a barrel mounted in alignment with the clamp and receiving the sleeve at one end. The barrel is slidable and may be grasped by the hand of the operator to force it against the tube while heat is being applied.

BRIEF DESCRIPTION OF THE DRAWINGS

FIG. 1 is a side elevational view of the tool used in accordance with the invention together with the sleeve and tube, the sleeve being partly sectioned;

FIG. 2 is a plan view of the tool and parts looking in the direction of the arrow 2 in FIG. 1;

FIG. 3 is a view similar to FIG. 1 but showing the sleeve in position within the barrel;

FIG. 4 is a view showing the barrel being forced against the sleeve with heat being applied thereto;

FIG. 5 is a view showing the sleeve after it has been forced on the tube; and

FIG. 6 is a cross-sectional view in elevation showing the tube after it has been soldered to a fitting.

DESCRIPTION OF THE PREFERRED EMBODIMENT

The purpose of the invention is to permit an aluminum tube 11 of any desired length to be attached to a copper, brass or steel fitting 12 (FIG. 6) by a conventional soft solder process, using solder 13.

According to the method of this invention, a thin copper sleeve 14 is provided, this sleeve having the same outside diameter as tube 11 and the length of the socket 15 that accepts the tube plus approximately one-fourth of an inch. Sleeve 14 has a slight flare 16 at one end thereof and is tinned on the inside with a zinc base solder 17. The end of sleeve 14 opposite flare 16 has a semicircular notch 18, the purpose of which is described below. This notch extends radially through both side of the sleeve.

In accordance with the invention, tube 11 is forced against the flared end of sleeve 14 and the latter is heated until the melt temperature of the tinning material (approximately 800°F.) is reached. At the same time the sleeve is forced against the end 19 of the tube, so that it will be forced over this end. The interference fit and the zinc base material will assure a leakproof bond. The assembly may then be inserted in socket 15 of fitting 12 and soft soldered in a conventional manner, as shown in FIG. 6.

A hand tool generally indicated at 21 is provided for carrying out the method of this invention. The hand tool comprises a clamp generally indicated at 22 and a barrel and guide generally indicated at 23, these parts being connected by an arched bridge 24. Clamp 22 has a lower part 25 fixed to one end of bridge 24 and a movable part 26 hinged at 27 thereto. These jaws are so shaped as to receive tube 11 of a specified outside diameter and a clamping screw 28 is provided which is threadably mounted in the jaws so as to secure them tightly together against the tube, thereby holding it in any axially adjusted position.

Barrel and guide assembly 23 comprises a cylindrical guide 29 secured to the end of bridge 24 opposite clamp 22, and a barrel 31 slidable therein. This barrel may be gripped at its outer end by the operator and at its inner end 32 is adapted to receive sleeve 14. A torque pin 33 extends radially through barrel 31 and is receivable by notches 18 when sleeve 14 has been inserted up to flared portion 16 (FIG. 3). Barrel 31 is also provided with a pair of spaced stops 34 and 35 which limit its axial movement.

In operation, sleeve 14 will first be placed within barrel 32 while the latter is so positioned that stop 34 is engageable with a guide 29. Clamp 22 will then be opened and one end of a tube 11 of the desired length placed therein, the end 19 of the tube being located adjacent flared end 16 of the sleeve. The latter will then be forced against end 19 of the tube (FIG. 4) and heat applied to barrel 31 by means such as a gas torch 36 in the vicinity of sleeve 14. As the melt temperature of tinning material 17 is reached, axial hand pressure will be applied to the barrel with a twisting action and the sleeve will be forced over the aluminum tube until torque pin 33 engages end 19 of the tube (FIG. 5), thus positively locating the final position of the sleeve. For purposes of clarity, the figures exaggerate the diminution in size of the end of tube 11 which will take place as sleeve 14 is forced thereon.

Barrel 31 may then be retracted to the right and clamp 22 loosened to remove the assembly of tube 11 and sleeve 14. This assmebly is then ready for soft soldering to fitting 12.

I claim:

1. As an article of manufacture for facilitating the connection of aluminum to brass, copper or steel by conventional low temperature soft soldering means, the combination comprising an aluminum tube, a thin copper sleeve having an outside diameter substantially equal to that of the tube, a flared end on said sleeve, and a tinning material on the interior surface of said sleeve, whereby the sleeve may be force fit onto said tube end with the application of heat at a high temperature which melts said tinning material and forms a hard solder joint, and whereby thereafter said sleeve may be soft soldered at said low temperature to brass, copper or steel without melting said hard solder joint.

2. The combination according to claim 1, the end of said sleeve opposite said flare having a radial notch for the reception of a torque applying member.

3. The combination according to claim 1, said tinning material being a zinc base solder.

* * * * *